(12) United States Patent
Kram et al.

(10) Patent No.: US 9,797,471 B2
(45) Date of Patent: Oct. 24, 2017

(54) ABSORBER SYSTEM

(71) Applicant: ZF FRIEDRICHSHAFEN AG, Friedrichshafen (DE)

(72) Inventors: Matthias Kram, Volkach (DE); Jörg Sudau, Niederwerrn (DE); Dennis Egler, Espenau (DE); Volker Stampf, Schweinfurt (DE); Kyrill Siemens, Würzburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/915,176

(22) PCT Filed: Jul. 29, 2014

(86) PCT No.: PCT/EP2014/066298
§ 371 (c)(1),
(2) Date: Feb. 26, 2016

(87) PCT Pub. No.: WO2015/028233
PCT Pub. Date: Mar. 5, 2015

(65) Prior Publication Data
US 2016/0208887 A1 Jul. 21, 2016

(30) Foreign Application Priority Data
Aug. 28, 2013 (DE) .......... 10 2013 217 090

(51) Int. Cl.
*F16F 15/14* (2006.01)
*F16H 45/02* (2006.01)

(52) U.S. Cl.
CPC .......... *F16F 15/145* (2013.01); *F16H 45/02* (2013.01); *F16H 2045/021* (2013.01);
(Continued)

(58) Field of Classification Search
CPC ...... F16F 15/145; F16F 15/1407; F16F 45/02; F16H 45/02; F16H 2045/021;
(Continued)

(56) References Cited

FOREIGN PATENT DOCUMENTS

| DE | 10 2009 042 818 | 5/2010 |
|---|---|---|
| DE | 10 2009 042804 | 6/2010 |

(Continued)

*Primary Examiner* — Thomas C Diaz
(74) *Attorney, Agent, or Firm* — Cozen O'Connor

(57) ABSTRACT

A mass damper system includes a damper mass carrier having movable damper mass and a stop. The damper mass moves within a predetermined movement region during an operating state. A first movement region portion bounded by an initial position in which the damper mass is free from a deflection in circumferential direction and by a limit position in which the damper mass has undergone a deflection, and a second movement region portion defined by the limit position and a stop position in which the damper mass has come in contact with the stop. At a side facing the stop, the damper mass has a proximity profile that correspond to a stop profile such that in the first movement region portion the damper mass remains within a residual distance region relative to the stop in one extension portion of the proximity profile.

7 Claims, 5 Drawing Sheets

(52) U.S. Cl.
CPC ........... *F16H 2045/0226* (2013.01); *F16H 2045/0263* (2013.01); *F16H 2045/0294* (2013.01)

(58) Field of Classification Search
CPC ..... F16H 2045/0226; F16H 2045/0263; F16H 2045/0294
See application file for complete search history.

(56) References Cited

FOREIGN PATENT DOCUMENTS

| | | | |
|---|---|---|---|
| DE | 10 2010 054 297 | 6/2011 | |
| DE | 10 2010 029464 | 12/2011 | |
| DE | 10 2010 054 207 | 6/2012 | |
| DE | 10 2011 086436 | 6/2012 | |
| FR | 2 986 591 | 8/2013 | |
| FR | 2986592 A1 * | 8/2013 | ............ F16F 15/145 |
| WO | WO 2013/117840 | 8/2013 | |

* cited by examiner

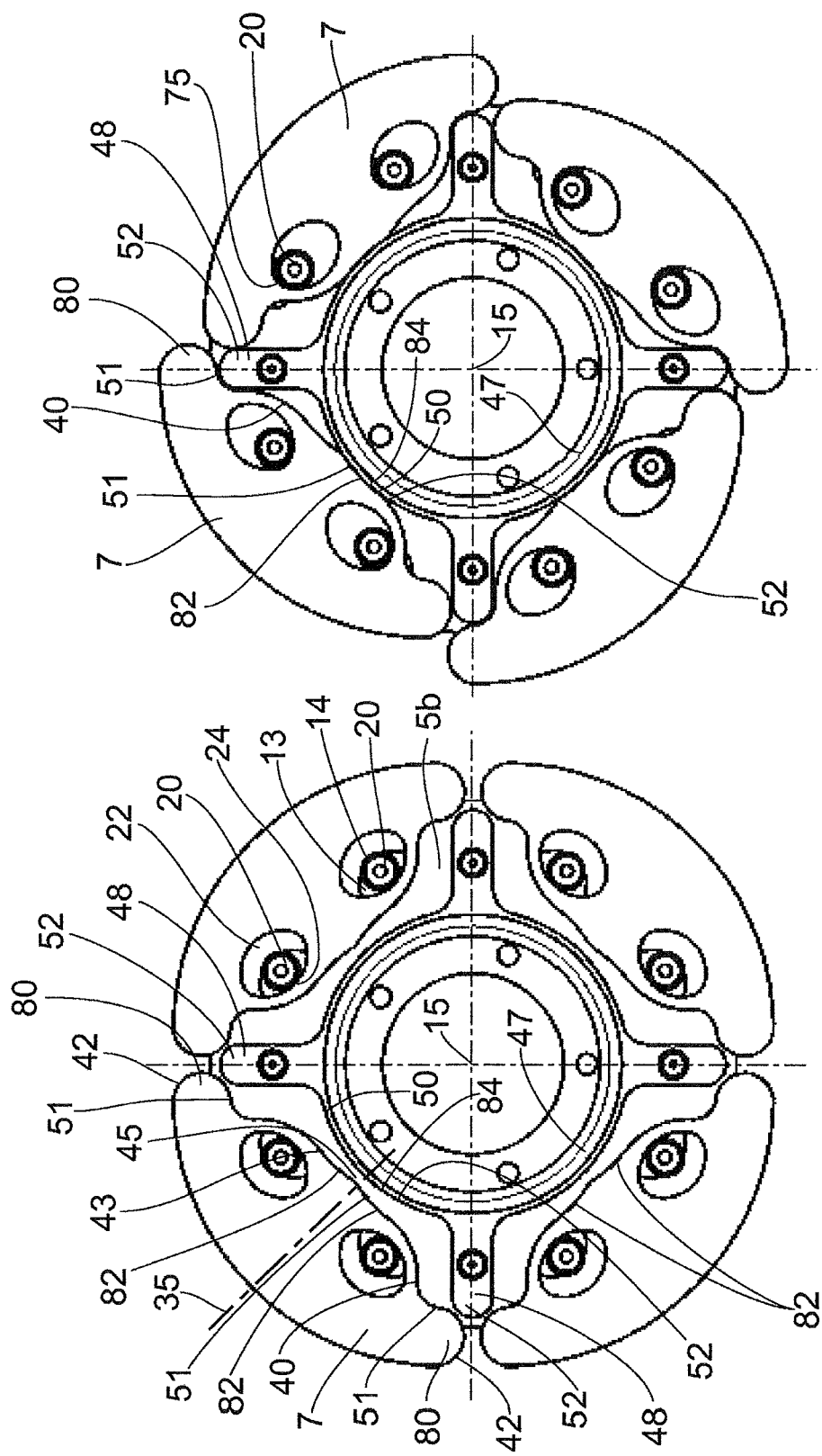

ABSORBER SYSTEM

CROSS REFERENCE TO RELATED APPLICATION

This is a U.S. national stage of application No. PCT/EP2014/066298, filed on Jul. 29, 2014. Priority is claimed on German Application No. DE102013217090.4, filed Aug. 28, 2013, the content of which is incorporated herein by reference.

BACKGROUND OF THE INVENTION

1. Field of the Invention

The present invention is directed to a mass damper system with a damper mass carrier at which is received at least one damper mass, which is movable relative to the damper mass carrier, and at least one stop. The damper mass moves within a predetermined movement region at least during an operating state in which a rotational movement of the damper mass carrier around a central axis has exceeded a predetermined limit speed.

2. Detailed Description of Prior Art

A mass damper system is known from DE 10 2009 042 818 A1. According to FIG. 1 of DE 10 2009 042 818A1, this mass damper system has in the radially inner region an annular component part which, like a hub disk serving as damper mass carrier, is secured to an output-side flywheel mass of the mass damper system. As can be seen particularly in FIG. 5 of DE 10 2009 042 818A21, the hub disk serves to receive a plurality of damper masses arranged successively in circumferential direction and, to this end, has two guide paths for each damper mass, these two guide paths being connected in each instance to two guide paths of the respective damper mass via a rolling body. The damper masses are displaceable in each instance in circumferential direction relative to the hub disk until coming in contact by radial extensions with a flexible stop associated with the respective movement direction. According to the construction in FIG. 1 of DE 10 2009 042 818A1, the flexible stop is provided at the annular component part.

In driving operation, i.e., in an operating state in which the rotational movement of the mass damper system—and, therefore, of the damper mass carrier—around a central axis has exceeded a predetermined limit speed, the damper masses remain inside a movement region bounded at one end by an initial position in which the damper masses are free from a deflection in circumferential direction and, at the other end, by a limit position in which the damper masses have undergone a deflection of a predetermined deflection distance in circumferential direction. While the damper masses operate sufficiently noiselessly in driving mode, the rotational movement of the mass damper system and, therefore, of the damper mass carrier around the central axis drops below the predetermined limit speed in other operating states, e.g., when turning off the corresponding drive such as an internal combustion engine, or in creep mode of the corresponding vehicle, and the centrifugal force acting on the damper masses accordingly decreases. As soon as the centrifugal force has dropped below the weight force, the damper masses drop down and generate an unacceptable impact noise in their paths and/or at the stops.

In a mass damper system with a damper mass carrier known from DE 10 2010 054 207 A1, there are damper masses provided on the damper mass carrier which have, according to FIGS. 4 and 5, circumferential projections at the radial outer regions thereof on the circumferential side. While increasing the weight of the damper masses, their inertial behavior can be enhanced in a particularly efficient manner by this step. In order to accommodate the same quantity of damper masses at the damper mass carrier without appreciably affecting the maximum oscillating angle of the damper masses in spite of the resulting greater extension of the damper masses in circumferential direction, the circumferential projections of the damper masses are formed with a curved contour. When the damper masses are adjacent to one another in circumferential direction, this contour fosters a radial overlapping in that it causes the circumferential projections to slide one upon the other when the damper masses approach one another. A relative swiveling position of the two damper masses, which already existed before, is enhanced in this way. While the efficiency of the damper masses in driving mode is improved as a result of this constructional step, this step has no effect in the other operating states mentioned above. For this reason, a stop provided at the damper mass carrier that arrests the movement of the associated damper mass in direction of the stop is associated with every damper mass in each circumferential deflecting direction. The damper masses come in contact with the respective associated stop with their circumferential sides and radially overlap the stop with their circumferential projections.

Understandably, the severity of the impact noise when the damper mass encounters the stop are proportionate to the acceleration of the damper mass leading up to the impact. Diverse measures have been undertaken to damp this impact noise, for example, forming the stop with an elastically deformable surface. However, it must be assumed that the cross section of the stop is enlarged as a result of forming the surface in this way, which would in turn have a disadvantageous effect on the maximum swiveling angle of the damper masses.

SUMMARY OF THE INVENTION

It is an aspect of the invention to construct a mass damper system provided with damper masses such that impact noise can be actively prevented during extreme deflections of the damper masses in driving mode and during operating phases other than the driving mode.

In accordance with one key aspect of the present invention, a mass damper system is provided with a damper mass carrier at which is received at least one damper mass which is movable relative to the damper mass carrier and with at least one stop, wherein the damper mass moves within a predetermined movement region at least during an operating state in which a rotational movement of the damper mass carrier around a central axis has exceeded a predetermined limit speed.

In this respect, it is significant that the predetermined movement region has at least two movement region portions, a first movement region portion being bounded at one end by an initial position in which the damper masses are free from a deflection in circumferential direction and, at the other end, by a limit position in which the damper mass has undergone a deflection of a predetermined deflection distance in circumferential direction, while a second movement region portion is defined at one end by the limit position and at the other end by a stop position in which the damper mass has come in contact with the stop. At least at a stop side facing the at least one stop, the at least one damper mass has a proximity profile shaped corresponding to a stop profile of the stop such that in the first movement region portion the damper mass remains within a residual distance region relative to the stop at least in at least one extension portion of the proximity profile in which this proximity profile comes closest to the stop profile of the stop, and in the second movement region portion at at least two impingement positions of the proximity profile which are provided so as to be circumferentially offset with respect to one another the damper mass comes in contact with at least two supporting positions of the stop which are provided so as to be circumferentially offset with respect to one another.

The first movement region portion is utilized in driving mode under normal operating conditions in which torsional vibrations superposed on a torque initiate deflections of the damper masses from their initial position but do not force the damper masses to deflect beyond the limit position. Under these operating conditions, the damper mass would move very closely, preferably measured by gap width, along the associated stop without contacting it, since the radial distance between the proximity profile of the respective damper mass and the stop profile of the stop remains within a residual distance region relative to the stop at least in at least one extension portion in which the proximity profile comes closest to the stop profile of the stop. However, apart from this, there are also operating states in which the rotational movement of the mass damper system and, therefore, of the damper mass carrier around the central axis decreases below the predetermined limit speed and, therefore, the centrifugal force acting on the damper masses falls below the weight force. As soon as the centrifugal force has fallen below the weight force, the damper masses no longer tend radially outward, but rather tend to fall downward (radially inward) owing to the weight force. This is the case, for example, when the corresponding drive such as an internal combustion engine is turned off or during creep operation of the corresponding vehicle. In an operating state such as this, the damper masses exit the permissible movement region but, because the proximity profiles have a radial distance from the associated stop profiles which lies within the residual distance region and which is therefore short, the damper masses can only build up a slight speed before coming to a standstill with their stop profile at the associated stop. Because of the resulting short "dropping height", a momentum of the damper masses remains limited when impinging on the associated stops, which can have a positive effect on possible impact noises.

On the other hand, when very adverse vibration conditions occur in driving mode, it cannot be ruled out that the damper masses will pass into the second movement region portion. As soon as the radial distance, which exists between the proximity profiles of the damper masses and the stop profile at the associated stop and which lies within the residual distance region is used up, the proximity profiles of the damper masses come in contact with the stop profile of the associated stop at least in two extension portions which are arranged so as to be circumferentially offset with respect to one another. In these at least two extension portions, which are arranged so as to be circumferentially offset with respect to one another, the proximity profile of the respective damper mass has impingement positions which come in contact with associated supporting positions of the stop profile of the stop. The supporting positions of the stop profile are also provided with a circumferential offset with respect to one another. As a result of this special kind of operative connection between the damper masses and the stop, a swiveling movement of the respective damper mass around its center of rotation is reliably prevented also at the end of its deflection path.

The impingement positions at the proximity profile of the respective damper mass and the supporting positions at the stop profile of the respective stop are preferably formed by radial projections and/or radial recesses and are accordingly formed in a profiled manner relative to the rest of the extension regions of proximity profile and stop profile. It is ensured that the operative connection between the damper masses and the stop is initiated in a gentle manner in that a continuous path is formed between the impingement positions and the rest of the extension regions of the respective proximity profile on the one hand and in that a continuous path is formed between the supporting positions and the rest of the extension regions of the respective stop profile on the other hand.

According to one embodiment of the mass damper system, damper masses are provided along the circumference of the damper mass carrier, at least some of which damper masses have a circumferential projection at its circumferential side. In damper masses of this kind, at least the outer supporting positions of the proximity profile on the circumferential side are provided at the circumferential projections, namely, at the radial inner side thereof. A particularly efficient mass inertia effect results with respect to the weight of the respective damper mass especially when these circumferential projections are provided in the radially outer region of the respective damper mass.

BRIEF DESCRIPTION OF THE DRAWINGS

The invention will be described in more detail in the following with reference to the accompanying drawings. The drawings show:

FIG. 4 is a different construction of the damper masses, shown in the initial position;

FIG. 5 is a view of the damper masses in the second movement region portion.

DETAILED DESCRIPTION OF THE PRESENTLY PREFERRED EMBODIMENTS

Figure 1:
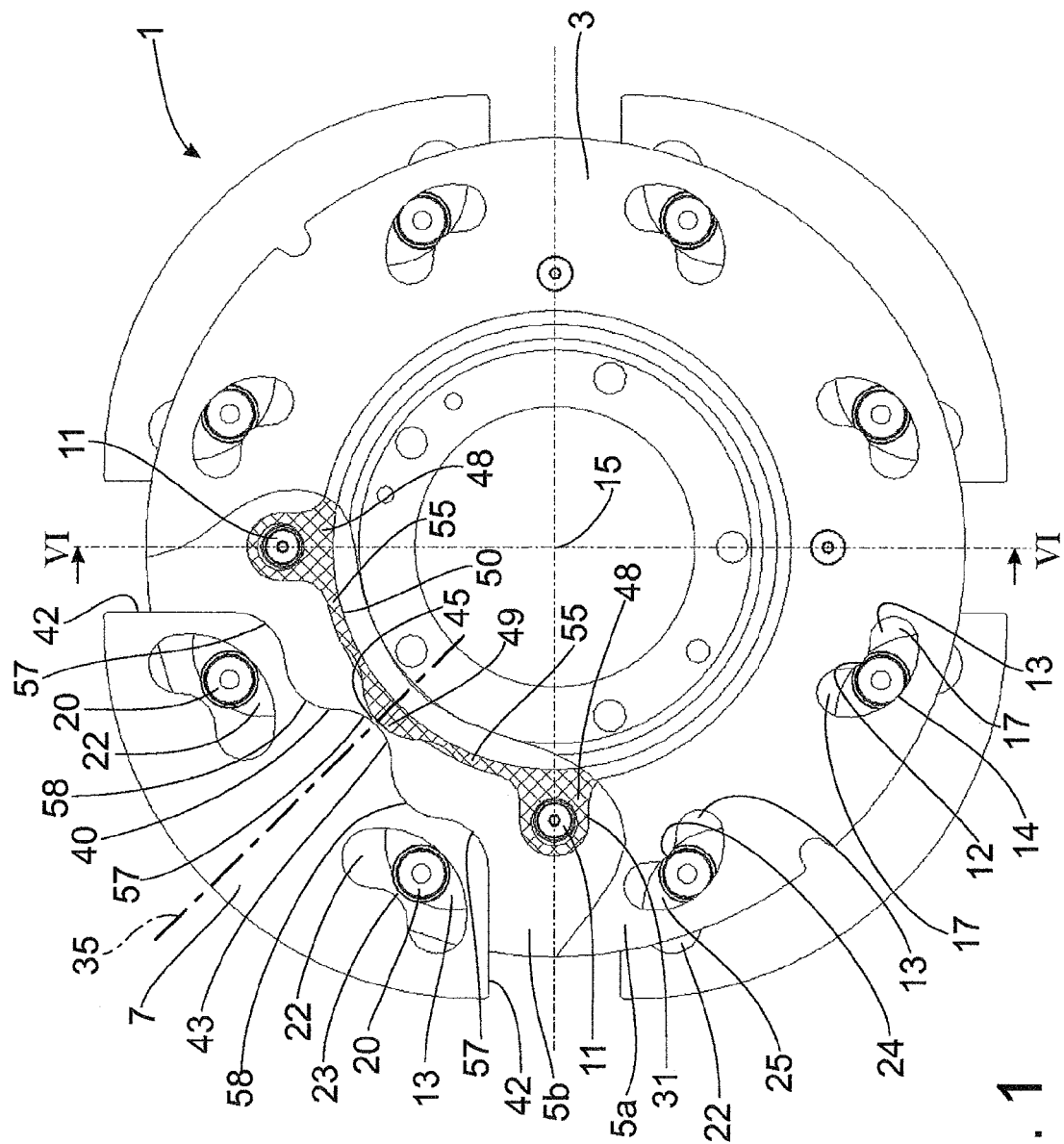
FIG. 1 is a top view of a mass damper system with damper masses and associated stops, wherein the damper masses are shown in an initial position occupied by the damper masses when centrifugal force exceeds weight force and without transmitted torsional vibrations.
Figure 6:
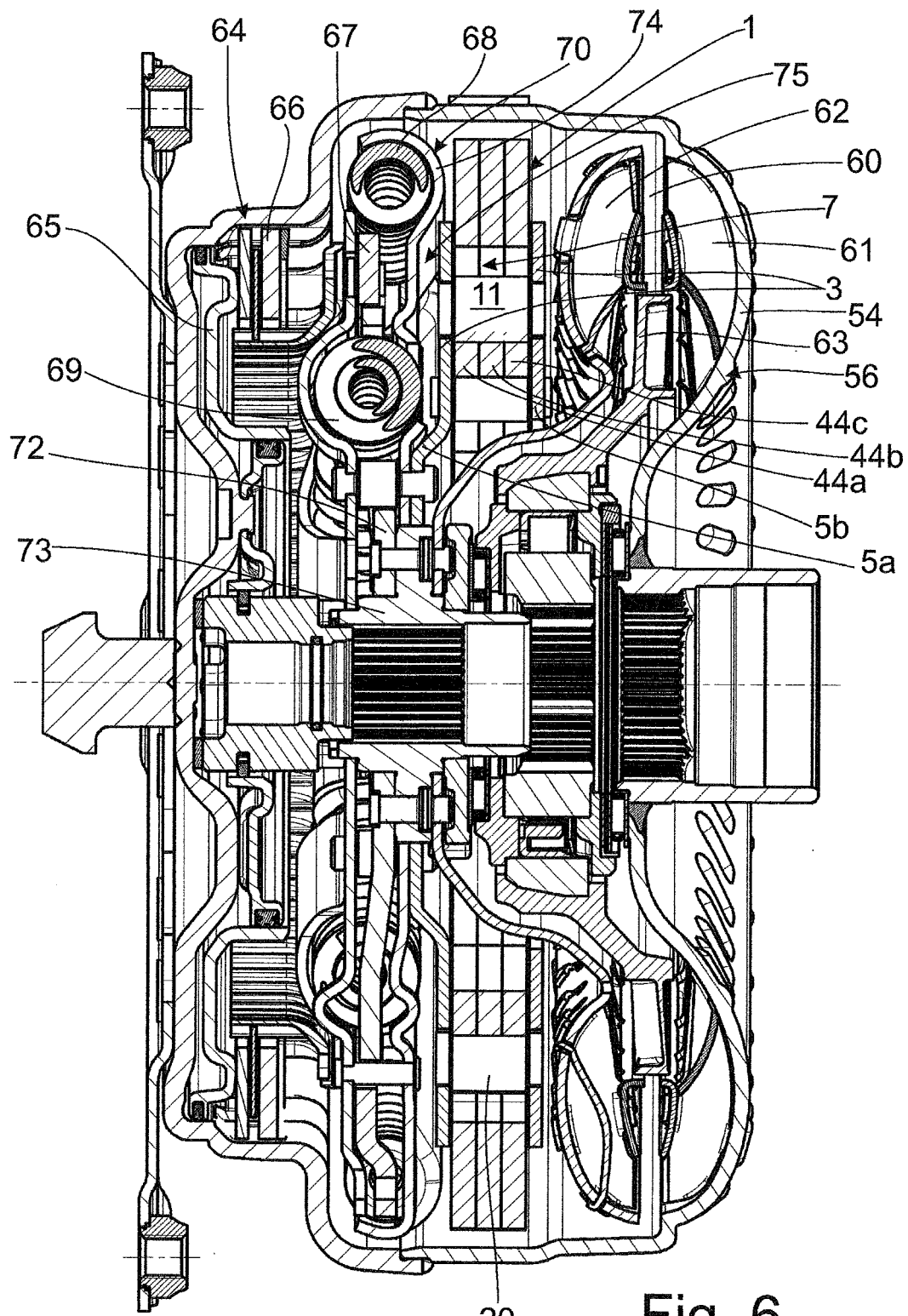
FIG. 6 is a view of the mass damper system at a torsional vibration damper in a hydrodynamic coupling arrangement.

FIG. 1 shows a mass damper system 1 with a damper mass carrier 3 that has two axially spaced damper mass support elements 5*a*, 5*b*. The damper mass support element 5*a* arranged axially in front of the damper masses 7 in viewing direction is shown in partial section for the sake of a clearer illustration. The two damper mass support elements 5*a*, 5*b* are connected to one another by spacer pieces 11. The two damper mass support elements 5*a*, 5*b* and one of the spacer pieces 11 are shown in FIG. 6 which is a view along section line VI-VI in FIG. 1. Beyond this, FIG. 6 also conveys particulars about damper mass 7, which accordingly has a plurality of damper mass elements 44*a* to 44*c* in axial direction. The circumferential sides 42 on both sides of the damper masses 7 adjoin a radially inner stop side 43. The stop side 43 of the respective damper mass 7 is profiled and has in the area of a damper mass center 35 a radial bulge 57 adjoined at both sides in circumferential direction in each instance by a radial indentation 58 which in turn passes again in circumferential direction into a further radial bulge 57 in each instance. Accordingly, these radial bulges 57 are provided adjoining the circumferential sides 42 of the respective damper mass 7. The individual radial bulges 57 and radial indentations 58 merge into one another in each instance by an at least substantially continuous path.

As is shown in FIG. 1, the damper masses 7 are arranged over rolling bodies 20 inside of guide paths 22 provided in each instance in the damper mass support elements 5a, 5b. The guide paths 13 have narrowed portions 12 in each instance so that a radial relative movement of the rolling bodies 20 with respect to the damper mass support elements 5a, 5b is prevented at least to a great extent. In contrast, the rolling bodies 20 extend with a radial clearance 23 into the guide paths 22 provided in the damper masses 7. This radial clearance 23 ensures a slight relative movability of the damper masses 7 relative to the rolling bodies 20 and, therefore, relative to the damper mass carrier 3. The guide paths 13 formed at the damper mass carrier 3 are provided, with respect to the relevant damper mass 7, in pairs on both sides of the damper mass center 35 of this damper mass 7 and extend in a curved manner, in each instance with an initial region 14 in which the respective guide path 13 has the greatest radial distance from a central axis 15 and with connection regions 17, which extend circumferentially opposite one another so as to adjoin at both sides of the initial region 14. The guide paths 22 provided at the damper masses 7 also extend in a curved manner, in each instance with an initial region 24 in which the respective guide path 22 has the greatest radial distance from a central axis 15, and with connection regions 25 which extend circumferentially opposite one another so as to adjoin at both sides of the initial region 24.

Each of the rolling bodies 20 received in the guide paths 13, 22 engages in each instance in two guide paths 13 provided on both sides of the respective guide path 22. In the diagram shown in FIG. 1, the damper masses 7 tend radially outward under centrifugal force so that the rolling bodies 20 position themselves in each instance in the initial region 24 of the respective guide path 22. In this regard, the rolling bodies 20 are supported in each instance in the initial region 14 of the damper mass support elements 5a, 5b.

A ring 47, which acts as a stop 31 for the damper masses, surrounds the central axis 15 radially inside of the damper masses 7. In the circumference-side extension region of a spacer piece 11 in each instance, the ring 47 has a radial protrusion 48 with which it overlaps the respective spacer piece 11. The ring 47 is secured to the damper mass support elements 5a, 5b by the radial protrusions 48 and spacer pieces 11. In circumferential direction at its side facing the respective damper mass 7, ring 47 further has a radial bulge 49 in each instance approximately midway between two radial protrusions 48 in each instance. A radial flattened portion 55 is located in each instance in circumferential direction between the respective radial protrusion 48 and the radial bulge, which radial flattened portion 55 passes into the respective circumferentially adjacent regions by an at least substantially continuous path. The radial outer side of the ring 47 facing the damper masses 7 is accordingly profiled. The stop side 43 of the respective damper mass 7 acts as a proximity profile 40 with respect to the radial outer side of the ring 47, while the radial outer side of the ring 47 serves as stop profile 50 with respect to the stop side 43 of the respective damper mass 7. The function of these profiles 40, 50 will be explained in detail in the following.

When the mass damper system 1 is operated in driving mode at a speed at which the centrifugal force exceeds the weight force, the damper masses 7 tend radially outward under centrifugal force so that the rolling bodies 20 can position themselves in the initial region 24 of the respective guide path 22 of the damper masses 7 in each instance and can be supported in the initial region 14 of the respective guide paths 13 of the damper mass support elements 5a, 5b. This state is illustrated in FIG. 1. It should be noted that a radial distance lying within a predetermined residual distance region 45 still remains radially between the radial bulge 57 of the respective damper mass 7 and the radially opposed radial bulge 49 of the ring 47, and therefore of stop 31. This residual distance region 45 is kept very small and, ideally, is reduced to gap width. In a particularly preferable manner, the residual distance region 45 is on an order of magnitude of a few millimeters, ideally on the order of between 1 and 1.5 mm. Particularly good results have been achieved with a residual distance region 45 on the order of approximately 1.2 mm.

Since torsional vibrations are generally superposed on a transmitted torque, the damper masses 7 deflect in circumferential direction so that the rolling bodies 20 are deflected out of the initial regions 24 of the guide paths 22 into the connection regions 25 thereof and from initial regions 14 of guide paths 13 into connection regions 17 thereof. Insofar as the damper masses 7 remain during this deflection movement within a first movement region portion of the total movement region in which they are not deflected beyond a predetermined limit position, there is always a radial distance between the respective damper mass 7 and the stop 31, which radial distance lies within the residual distance region 45, as can be seen from FIG. 7b. This applies in particular for at least one extension portion of the proximity profile 40 by which the proximity profile 40 comes closest to the stop profile 50 of the stop 31.

Figure 2:
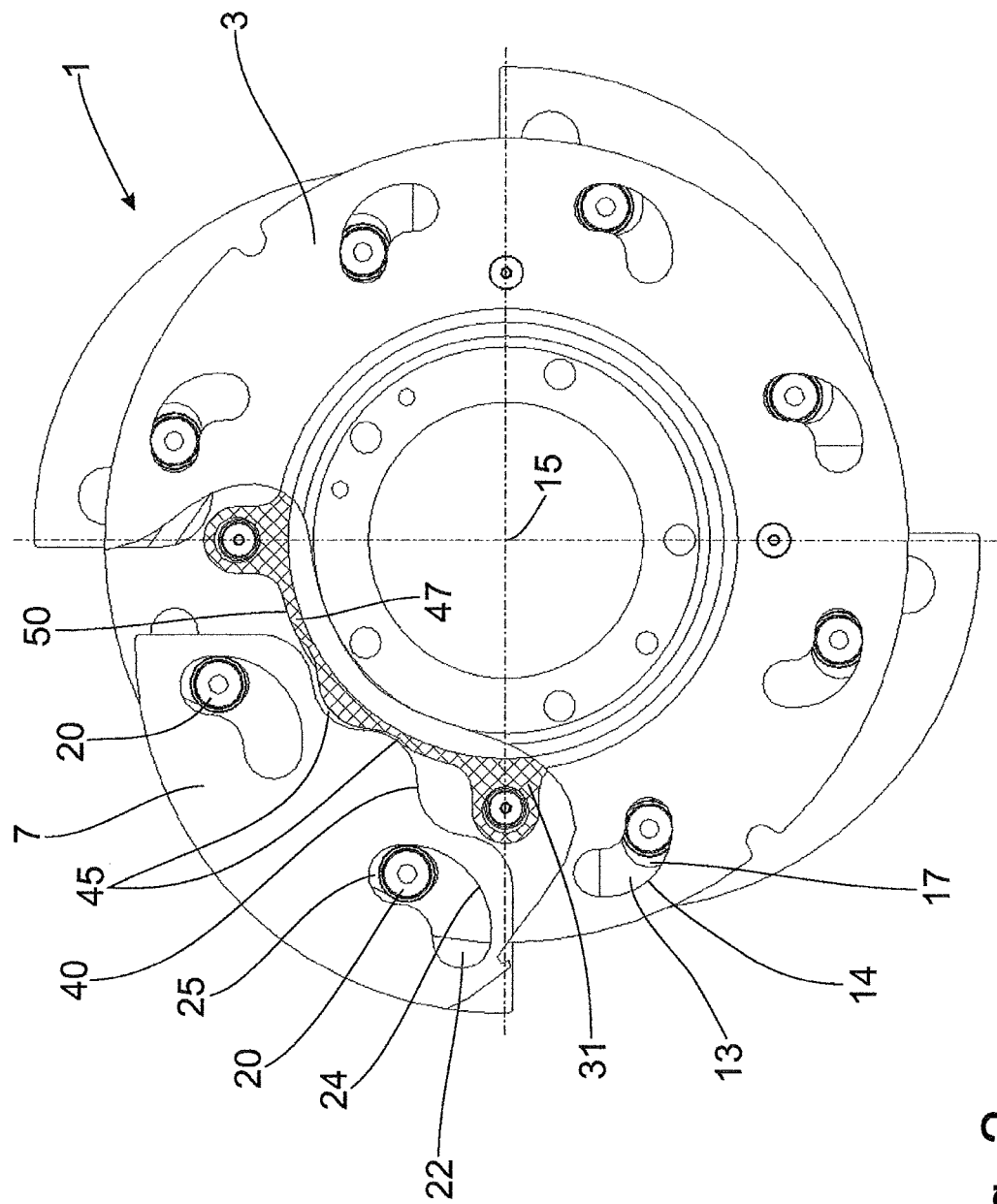
FIG. 2 is a view of the damper masses in a deflecting position within a first movement region portion which is determined by the deflecting position at one end and by a limit position at the other end.

The limit position for the damper masses 7, and, therefore, the extent of the first movement region portion, preferably lies in a deflection angle range of up to about 48°. Referring to FIG. 2, the extent of deflection of the damper masses 7 from the respective initial region is about 45°. The damper masses 7 are always restored to the initial position under centrifugal force as the torsional vibration decays.

Keeping the radial distance radially between the respective damper mass 7 and the stop 31 within the residual distance region 45 until reaching the limit position for the damper masses 7 in the deflection angle range of up to about 48° makes sense for the following reason: when the centrifugal force drops below the weight force, for example, in creep mode of a motor vehicle or when stopping a drive, e.g., an internal combustion engine, the damper masses 7 drop until at least a portion of the damper masses 7 has reached the associated stop 31 and accordingly comes to a stop. Regardless of whether a portion of the damper masses 7 arrives in contact with the respective stop 31 indirectly via another damper mass 7 or whether all of the damper masses 7 arrive directly in contact with the stop 31, the distance to be overcome is at most on the order of the residual distance region 45. Owing to this extremely small distance, the dropping damper masses 7 can only build up a limited velocity. Accordingly, the momentum when impinging on the stop 31 or on the adjacent damper mass 7 remains small and generates a correspondingly slight impact noise.

Figure 3:
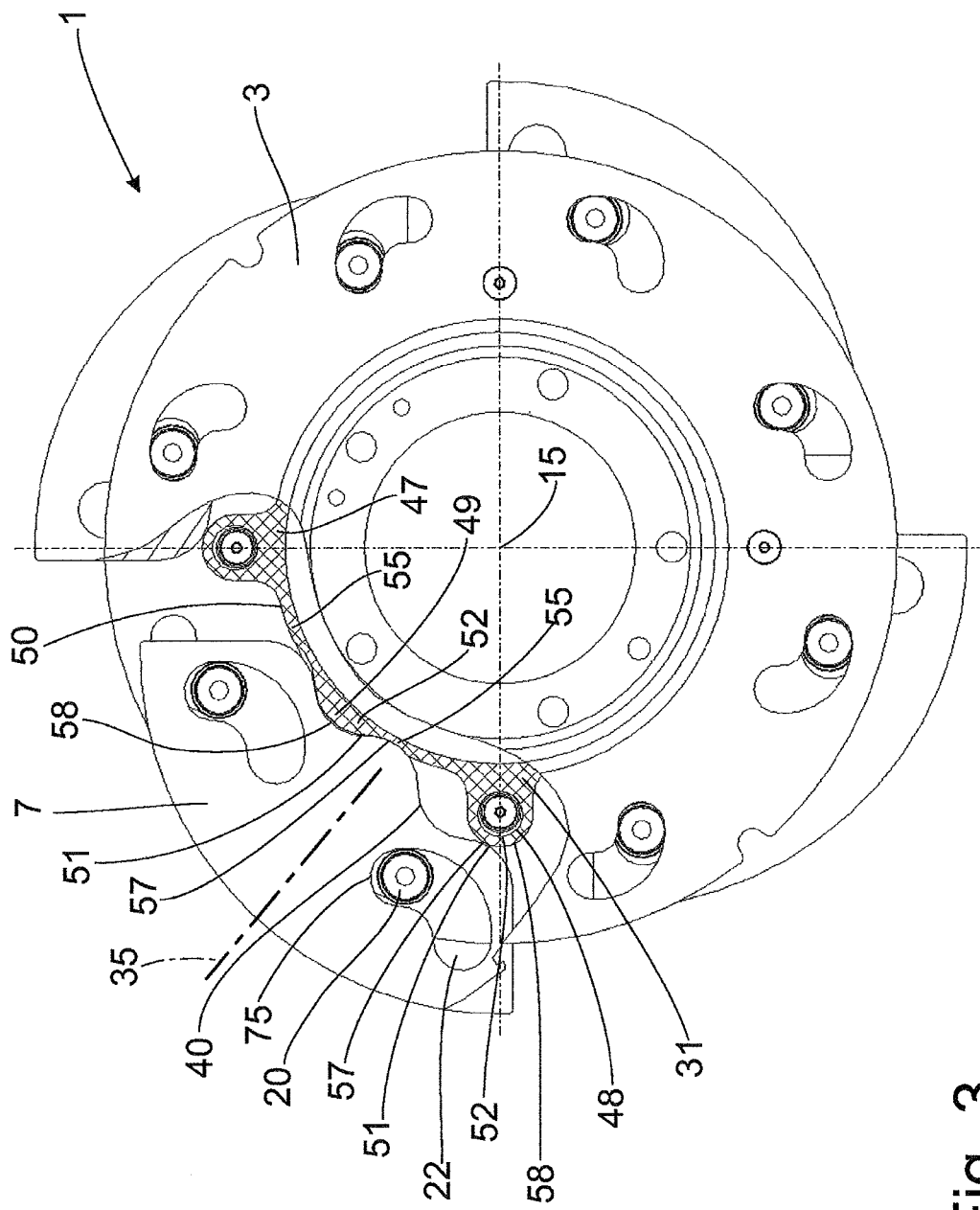
FIG. 3 is a view of the damper masses in a deflecting position within a second movement region portion determined by the limit position at one end and by a stop position at the other end.

When torque with even stronger torsional vibrations is introduced, the state shown in FIG. 3 is reached. In this state, the damper masses 7 are strongly deflected in circumferential direction such that they pass into a second movement region portion of the total movement region. In this second movement region portion, the damper masses 7 are deflected beyond the predetermined limit position, i.e., into an angular region above about 48° proceeding from the initial region. As soon as the radial distance between the proximity profile 40 of the damper mass 7 and the stop profile 50 of the ring 47 within the residual distance region 45 is used up, impingement positions 51 of the proximity profile 40 of the respective damper mass 7 come in contact with supporting positions 52 of the stop profile 50 in this second movement region portion. A first impingement position 51 of the proximity profile 40 is located at that radial bulge 57 of the damper mass 7 that is located at the front end thereof in deflecting direction. A second impingement position 51 of the proximity profile 40 is located at the radial bulge 57 in the region of the damper mass center 35 and at least partially at the adjacent radial indentation 58 located behind this radial bulge 57 in deflecting direction. The radial bulge 57 of the first impingement position 51 cooperates with the associated radial protrusion 48 serving as first supporting position 52 at the stop profile 50 of the ring 47, while a second supporting position 52 of the stop profile 50 is provided at the radial bulge 49 located in circumferential direction between the two radial protrusions 48 and, at least partially, at the radial flattened portion 55 located in front of this radial bulge 49 in deflecting direction of the damper mass 7.

As soon as the impingement positions 51 of the proximity profile 40 of the respective damper mass 7 have impinged on the associated supporting positions 52 of the stop profile 50 of the ring 47, the deflecting movement of the damper masses 7 in deflecting direction ceases, namely, before the circumferential ends 42 of the damper masses 7 come in contact with one another and/or the rolling bodies 20 come in contact with the guide paths 13 or 22 accompanied by impact noise. Due to the support of the respective damper mass 7 via at least two impingement positions 51 of the proximity profile 40 at two supporting positions 52 of the stop profile 50, a broad positioning of the damper masses in circumferential direction is achieved so that an exactly defined orientation can be achieved without unwanted swiveling around the respective damper mass center 35.

FIGS. 4 and 5 show a construction that deviates from the previous construction but functions on the same operating principle. In this construction, the damper masses 7 have in each instance at their circumferential sides 42 a circumferential projection 80, a first impingement position 51 of the proximity profile 40 being provided in each instance at the radial inner side of the circumferential projection 80. A second impingement position 51 follows the first impingement position 51 in circumferential direction in that one of the two formations 82 provided so as to adjoin the damper mass center 35 serves as second impingement position 51. On the other hand, one of the radial protrusions 48 in each instance serves as first supporting position 52 of the stop profile 50 at the radial outer side of the ring 47 facing the respective damper mass 7, while a second supporting position 52 is available in circumferential direction between two radial protrusions 48 at an annular portion 84 of the ring 47.

In driving mode at a speed at which the centrifugal force exceeds the weight force, the damper masses 7, as is shown in FIG. 4, tend radially outward under centrifugal force so that the rolling bodies 20 can position themselves in the initial region 24 of the respective guide path 22 of the damper masses 7 in each instance and can be supported in the initial region 14 of the respective guide paths 13 of the damper mass support elements 5a, 5b. In this construction also, there still remains radially between the stop side 43 of the respective damper mass 7 and the radially opposed annular portion 84 of the ring 47 and, therefore, of the stop 31 a radial distance lying within the residual distance region 45.

FIG. 5 shows the damper masses 7 in each instance in a position occupied by them during strong deflection, in the present case at a deflection of approximately 48° proceeding from the initial region. Accordingly, the damper masses 7 have entered the second movement region portion of their movement range. In this second movement region portion, the respective damper mass 7 with the previously described impingement positions 51 of the proximity profile 40 comes in contact with the supporting positions 52 of the stop profile 50 as soon as the radial distance between the proximity profile 40 of the damper mass 7 and the stop profile 50 of the ring 47 within the residual distance region 45 is used up. Whereas in the present instance, the first impingement position 51 of the proximity profile 40 is implemented at that circumferential projection 80 of the damper mass 7 that is located at the front end thereof in deflecting direction, the second impingement position 51 of the proximity profile 40 is provided at the formation 82 of the damper mass 7 adjoining the damper mass center 35. The circumferential projection 80 of the first impingement position 51 cooperates with the associated radial protrusion 48 serving as first supporting position 52 at the stop profile 50 of the ring 47, while the second supporting position 52 of the stop profile 50 is provided at the annular portion 84 located in circumferential direction between the two radial protrusions 84.

As has already been described with regard to the first construction, the deflecting movement of the damper masses 7 in deflecting direction ceases as soon as the impingement positions 51 of the proximity profile 40 of the respective damper mass 7 have impinged on the associated supporting positions 52 of the stop profile 50 of the ring 47. In this instance, again, this takes place before the circumference-side ends 75 of the damper masses 7 and the rolling bodies 20 come in contact with one another accompanied by impact noise.

FIG. 6 shows an installation situation for the mass damper system 1 according to one embodiment of the invention. Accordingly, the mass damper system 1 is part of a torsional vibration damper 30 provided in the housing 54 of a hydrodynamic coupling arrangement 56. This hydrodynamic coupling arrangement 56 has a hydrodynamic circuit 60 with impeller 61, turbine 62 and stator 63 and a clutch mechanism 64 having a clutch piston 65 and a friction disk clutch 66. Depending on the actuation of the clutch piston 65, the clutch mechanism 64 is movable between an engaged position and a disengaged position. The clutch mechanism 64 is connected to a torsion damper input 67 of a damping device 70 having two circumferential spring sets 68, 69, and the torsion damper output 72 of the damping device 70 cooperates with an output 73. An intermediate torsion damper component 74 at which a damper mass support element 5 of the damper mass carrier 3 of the mass damper system 1 is received so as to be fixed with respect to relative rotation is operative between the two circumferential spring sets 68, 69. Together with the mass damper system 1, the damping device 70 forms the torsional vibration damper 30.

By way of supplementing the previous figures, FIG. 6 clearly shows the damper mass support elements 5a, 5b which are axially spaced apart from one another and which collectively form the damper mass carrier 3 and hold between them the damper masses 7 which are in each instance formed of a plurality of parts, damper mass elements 44a to 44c. Also clearly shown is one of the plurality of provided spacer pieces 11 that holds the two damper mass support elements 5a, 5b at a predetermined axial distance from one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A mass damper system comprising:
a damper mass carrier;
at least one damper mass with at least one stop that is received at and movable relative to the damper mass carrier, wherein the at least one damper mass moves within a predetermined movement region at least during an operating state in which a rotational movement of the damper mass carrier around a central axis exceeds a predetermined limit speed,
wherein the predetermined movement region has at least two movement region portions:
a first movement region portion bounded at a first end by an initial position in which the at least one damper mass is free from a deflection in circumferential direction and at a second end by a limit position in which the at least one damper mass has undergone a deflection of a predetermined deflection distance in circumferential direction, and
a second movement region portion is defined at one end by the limit position and at the other end by a stop position in which the at least one damper mass has come in contact with the stop, and
wherein the at least one damper mass has a proximity profile at a stop side facing the at least one stop that is shaped corresponding to a stop profile of the stop such that in the first movement region portion the at least one damper mass remains within a residual distance region relative to the stop at least in at least one extension portion of the proximity profile in which this proximity profile comes closest to the stop profile of the stop, and
wherein in the second movement region portion at at least two impingement positions of the proximity profile provided so as to be circumferentially offset with respect to one another, the at least one damper mass comes in contact with at least two supporting positions of the stop profile of the stop that are provided so as to be circumferentially offset with respect to one another,
wherein the at least two impingement positions of the proximity profile or the supporting positions of the stop profile are formed, respectively, by one of a radial recess or by a radial projection, wherein a radial projection at the one profile is associated in each instance with a radial recess at the other one of the profiles.

2. The mass damper system according to claim 1, wherein the residual distance region of the proximity profile of the at least one damper mass relative to the stop profile of the stop is dimensioned to gap width.

3. The mass damper system according to claim 1, wherein the at least two impingement positions of the proximity profile and the supporting positions of the stop profile pass into the rest of the regions of the proximity profile or of the stop profile at least substantially by a continuous path in each instance.

4. The mass damper system according to claim 1,
wherein the stop is formed as a ring that surrounds the central axis,
wherein the ring is provided in circumferential direction with radial protrusions that are arranged at predetermined angular distances from one another and that serve to fasten the stop to the damper mass carrier, and
wherein the radial protrusions of the stop in each instance form one of the at least two supporting positions of the stop profile.

5. The mass damper system according to claim 4,
wherein the ring has at least one radial bulge in circumferential direction between every two radial protrusions,
wherein this at least one radial bulge in each instance forms a second of the at least two supporting positions of the stop profile.

6. The mass damper system according to claim 5, wherein the at least one damper mass, having its proximity profile facing the ring and being associated with the radial bulge of the ring, has a radial bulge and, on both sides thereof, radial indentations, at least one of which acts as impingement position of the proximity profile of the at least one damper mass.

7. A mass damper system comprising:
a damper mass carrier;
at least one damper mass with at least one stop that is received at and movable relative to the damper mass carrier, wherein the at least one damper mass moves within a predetermined movement region at least during an operating state in which a rotational movement of the damper mass carrier around a central axis exceeds a predetermined limit speed,
wherein the predetermined movement region has at least two movement region portions:
a first movement region portion bounded at a first end by an initial position in which the at least one damper mass is free from a deflection in circumferential direction and at a second end by a limit position in which the at least one damper mass has undergone a deflection of a predetermined deflection distance in circumferential direction, and
a second movement region portion is defined at one end by the limit position and at the other end by a stop position in which the at least one damper mass has come in contact with the stop, and
wherein the at least one damper mass has a proximity profile at a stop side facing the at least one stop that is shaped corresponding to a stop profile of the stop such that in the first movement region portion the at least one damper mass remains within a residual distance region relative to the stop at least in at least one extension portion of the proximity profile in which this proximity profile comes closest to the stop profile of the stop, and wherein in the second movement region portion at at least two impingement positions of the proximity profile provided so as to be circumferentially offset with respect to one another, the at least one damper mass comes in contact with at least two supporting positions of the stop profile of the stop that are provided so as to be circumferentially offset with respect to one another, wherein the at least two impingement positions of the proximity profile or the supporting positions of the stop profile are formed, respectively, by one of a radial recess or by a radial projection, wherein a radial projection at the one profile is associated in each instance with a radial recess at the other one of the profiles, wherein the at least one damper mass has a circumferential projection on at least one of its circumferential sides, which circumferential projection forms by its radial inner side an impingement position of the proximity profile of the at least one damper mass.

* * * * *